United States Patent
Kanno et al.

(10) Patent No.: US 7,047,489 B2
(45) Date of Patent: *May 16, 2006

(54) SLIDE SHOW SYSTEM AND METHOD USING A BROWSER

(75) Inventors: Hironori Kanno, Miyagi (JP); Yoshiyuki Hirashima, Miyagi (JP); Mikio Furuyama, Miyagi (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/244,043

(22) Filed: Feb. 4, 1999

(65) Prior Publication Data

US 2002/0194216 A1    Dec. 19, 2002

(30) Foreign Application Priority Data

Jul. 29, 1998    (JP) ................... 10-213799

(51) Int. Cl.
*G06F 17/00* (2006.01)
(52) U.S. Cl. .................... 715/526; 715/500.1
(58) Field of Classification Search ........... 707/501.1, 707/500.1, 513; 345/730–732; 715/500.1, 715/501.1, 513, 526
See application file for complete search history.

(56) References Cited

U.S. PATENT DOCUMENTS 5,809,247 A * 9/1998 Richardson et al. ........ 709/202
5,812,736 A * 9/1998 Anderson ................... 386/96
5,890,172 A * 3/1999 Borman et al. ............. 707/501
6,008,807 A * 12/1999 Bretschneider et al. ..... 345/339
6,041,333 A * 3/2000 Bretschneider et al. ..... 707/203
6,072,480 A * 6/2000 Gorbet et al. ............... 345/302
6,084,582 A * 7/2000 Qureshi et al. ............. 345/302
6,128,712 A * 10/2000 Hunt et al. .................. 711/158
6,157,364 A * 12/2000 Kohler ....................... 345/855
6,163,779 A * 12/2000 Mantha et al. ............. 707/100
6,182,122 B1 * 1/2001 Berstis ........................ 709/217
6,195,679 B1 * 2/2001 Bauersfeld et al. ......... 709/203
6,209,027 B1 * 3/2001 Gibson ....................... 709/218
6,286,029 B1 * 9/2001 Delph ........................ 709/203
6,338,075 B1 * 1/2002 Fukuda ..................... 707/501.1
6,904,450 B1 * 6/2005 King et al. ................. 709/203

OTHER PUBLICATIONS

Notice of Rejection Grounds (Office Action) in corresponding Japanese Patent Application No. H11-184852 mailed 9/6/205.
Tatsuro Kitazato, "NEC Developed Software for Automatically Updating WWW Documents like a Picture-story Show", Nikkei Electronics, Nikkei BP corporation, No. 687, pp. 24-25 (Apr. 21, 1997).

* cited by examiner

*Primary Examiner*—Sanjiv Shah
(74) *Attorney, Agent, or Firm*—Staas & Halsey LLP

(57) ABSTRACT

When a presentation is performed using a web browser, in a manual mode, the display sequence of web pages registered in a bookmark list is specified using an operation button, and in an automatic mode, a plurality of pages registered in a bookmark list are automatically displayed in a predetermined sequence. Further, background music and a narration are also automatically played back.

13 Claims, 14 Drawing Sheets

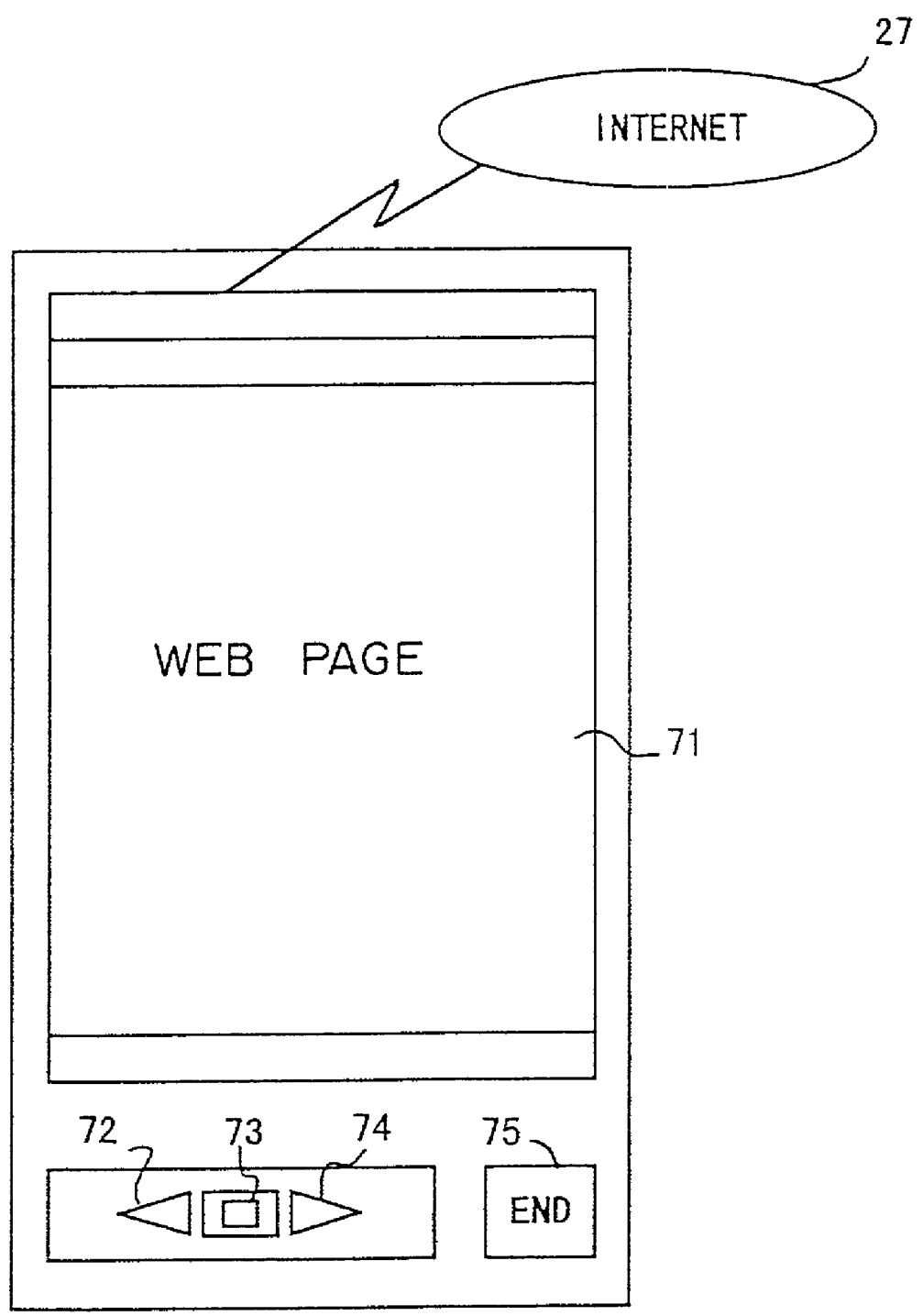
F I G. 4

| FLAG NAME=FLAG | MEANING |
|---|---|
| AUTO=Yes | AUTOMATIC DISPLAY IS PERFORMED? Yes OR No |
| MAXNUM=20 | MAXIMUM VALUE OF DISPLAY SEQUENCE NUMBER |
| WAIT(i)=60 | IN CASE OF AUTOMATIC DISPLAY, INTERVAL BETWEEN DISPLAYS (SECONDS) (i=1..MAXNUM) |
| BGM(i)=Yes | BGM IS PLAYED? Yes OR No (i=1..MAXNUM) |
| BGM_FILE(i)=song.avi | FILE OF BGM (i=1..MAXNUM) |
| NARRATION(i)=Yes | NARRATION IS PLAYED BACK? Yes OR No (i=1..MAXNUM) |
| NARRATION_FILE(i)=nal.avi | FILE OF NARRATION (i=1..MAXNUM) |

F I G. 5

| TITLE | URL | IMAGE FILE NAME | COMMENT | COORDINATE VALUE | DISPLAY SEQUENCE NUMBER |
|---|---|---|---|---|---|
| xxx HOME Page | http://www.xxx.co.jp | xxx1.bmp | hogehoge... | 10, 10 | 1 |
| yyy HOME Page | http://www.yyy.co.jp | xxx3.bmp | hogehoge... | 40, 10 | 3 |
| zzz HOME Page | file:///D|/cache/file1.html | xxx4.bmp | hogehoge... | 80, 10 | 5 |
| .. | | | .. | .. | .. |

FIG. 6

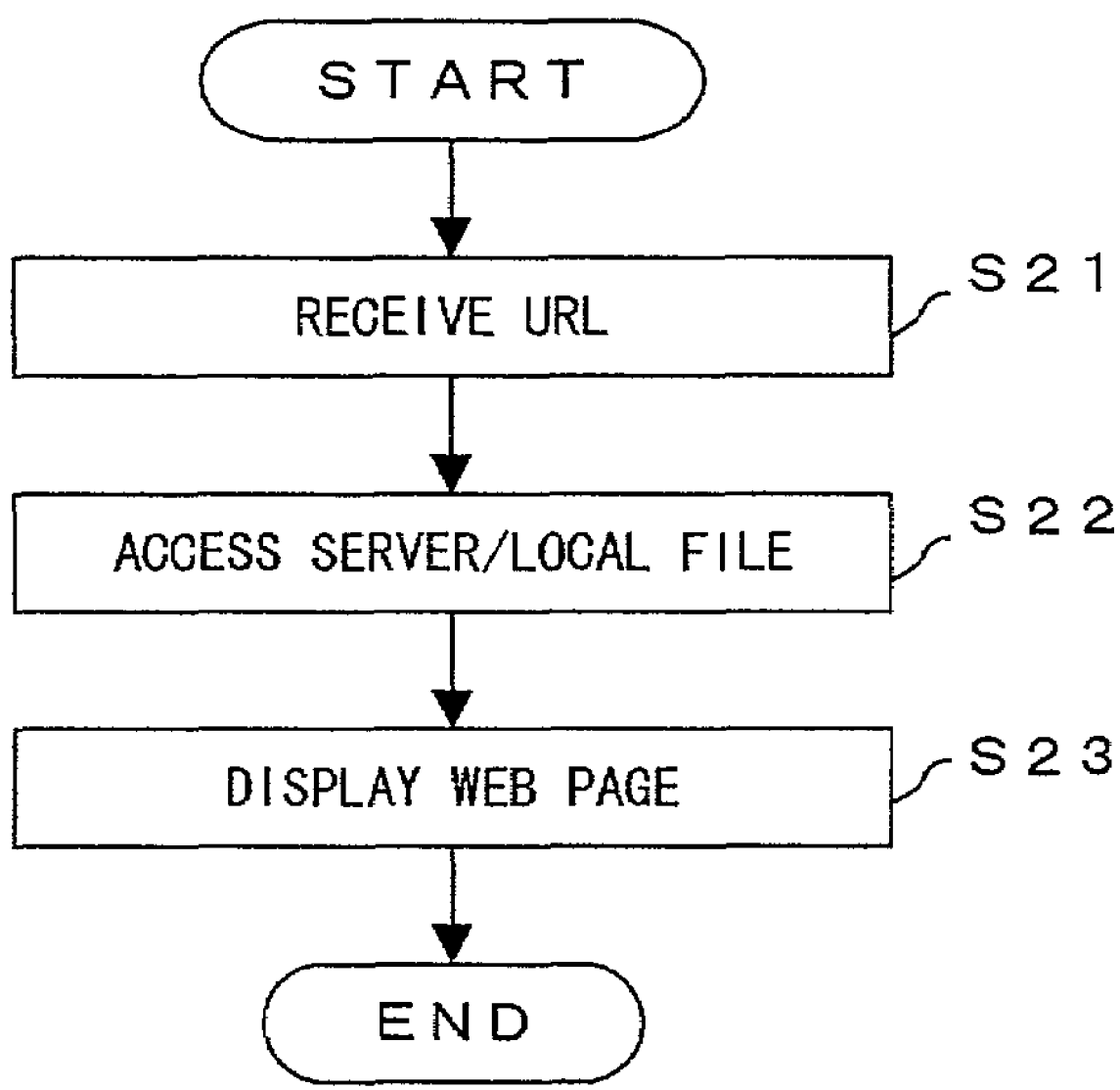
F I G. 8

| FLAG NAME=FLAG | MEANING |
|---|---|
| AUTO=Yes | AUTOMATIC DISPLAY IS PERFORMED? Yes OR No |
| MAXNUM=20 | MAXIMUM VALUE OF DISPLAY SEQUENCE NUMBER |
| WAIT=60 | IN CASE OF AUTOMATIC DISPLAY, INTERVAL BETWEEN DISPLAYS (SECONDS) |
| BGM=Yes | BGM IS PLAYED? Yes OR No |
| BGM_FILE=song.avi | FILE OF BGM |
| NARRATION=Yes | NARRATION IS PLAY BACK? Yes OR No |
| NARRATION_FILE=nal.avi | FILE OF NARRATION |

F I G. 1 0

SLIDE SHOW SYSTEM AND METHOD USING A BROWSER

BACKGROUND OF THE INVENTION

1. Field of the Invention

The present invention is related to a slide show system and its method for performing a slide show using screen information obtained by a browser, in a browser system which refers to an information network such as a WWW (World Wide Web) which is a currently a main source of information on the Internet.

2. Description of the Related Art

The Internet is realized by connecting a plurality of computers via a communication network. A world-wide information network which is realized by the Internet is named a WWW system. Recently, as an amount of information transmission increases over the WWW system, various kinds of multi-media information have been provided on the Internet.

A page of the WWW (a web page) is a unit of the multi-media information to be provided on the WWW, and is composed of an HTML (HyperText Markup Language) document and related data which are stored in an arbitrary WWW server. The WWW server transmits this web page to a browser provided on a WWW client according to an HTTP (HyperText Transfer Protocol). The WWW browser displays the thus-received web page on a screen of the WWW client.

The web page generally can provide text information composed of character data, image information composed of graphic data, audio information, animation information or the like to a user by using the HTML. Therefore, here, the display of a web page includes not only the outputting of text information or image information but also the outputting audio information, animation information or the like, which is included in the web page.

In order that a user accesses such information, it is necessary to input address information which uniquely represents a server and an HTML document storing that information. This address information is composed of several character strings and is named a URL (Uniform Resource Locator).

However, it is difficult for a user to remember a complicated URL composed of several tens of characters for a long time. Further, in a case where a predetermined page is required to be referred to many times, it is neither convenient nor effective to type this URL every time. Therefore, in order to easily display a web page, a WWW browser is generally provided with a function named a bookmark.

The bookmark function is to register a site which a user is fond of and a page which is frequently accessed, in a browser. The user first registers the URL of a page to be displayed as a bookmark. Then, at the time of accessing, the user displays a list of pages which are registered as bookmarks, and selects a desired page by clicking a mouse. Thus, the user can display his or her desired page without inputting a complicated URL.

FIG. 1 shows an example of a representative bookmark display screen. As shown in FIG. 1, a set of bookmarks 2 can be stored in a folder 1, and the bookmarks 2 are hierarchically managed.

In a folder "Lookup", bookmarks 2 such as "People" and "Yellow Pages" are registered. These bookmarks 2 are list-displayed by clicking the folder "Lookup". The user selects a desired page by double-clicking a line (an object) indicating the bookmark 2 such as "People" or the like so that he or she can display the desired page on a screen.

However, there arise the following problems about the above-mentioned conventional WWW browser:

Recently, as the functions of a portable personal computer become enhanced and its cost decreases, a lot of presentations and conferences have taken place using such a personal computer. When such presentations or conferences take place, information of a web page is frequently displayed by connecting the personal computer to the Internet.

However, there are a lot of cases where time is greatly restricted when a presentation or a conference is taking place. Therefore, it is neither convenient nor effective to type the above-mentioned URL every time. Therefore, it is thought that the bookmark function is used as a method of quickly displaying a web page. However, this case also requires a lot of effort to display a list of bookmarks and to click the bookmark of a desired page each time, so that it takes a predetermined operation time period to display a page in a browser.

There is a case where a speaker explains pages changing some pages every few minutes according to the contents of a presentation. In this case, it is necessary to type a URL or select a bookmark whenever changing pages, so that a sufficient explanation cannot be given since the speaker spends a lot of time for operation of the browser system.

SUMMARY OF THE INVENTION

An object of the present invention is to provide a slide show system and method for easily and effectively displaying information of one or more web pages, thereby performing an effective slide show, when a presentation or a conference is taking place, in a browser system which refers to a WWW system.

The slide show system in a first aspect of the present invention includes a browser unit and a control unit.

The browser unit obtains information using address information defined on an information network and outputs the thus-obtained information. The control unit informs the address information to the browser unit according to a predetermined output sequence specified by a user and instructs the output of information corresponding to the informed address information.

Further, a program for causing a computer to perform a processing is stored in a storage medium in a second aspect of the present invention.

This processing includes referring to a correspondence relationship between a plurality of pieces of address information defined on the information network and a plurality of sequence numbers representing a predetermined output sequence specified by a user, and informing the address information corresponding to the current sequence number to the browser unit so that the output of information corresponding to the informed address information is instructed.

Further, a program for causing a computer to perform a processing is stored in a storage medium in a third aspect of the present invention.

This processing includes referring to a correspondence relationship between a plurality of pieces of address information defined on the information network and a plurality of sequence numbers representing a predetermined output sequence specified by a user, obtaining information using the address information corresponding to the current sequence number, and outputting the obtained information.

BRIEF DESCRIPTION OF THE DRAWING

FIG. 4 is a diagram showing a slide show screen;

FIG. 5 is a diagram showing a first operation control parameter file;

FIG. 6 is a diagram showing a bookmark data file;

FIG. 8 is a flowchart showing processing to be performed by a browser;

FIG. 10 is a diagram showing a second operation control parameter file;

DESCRIPTION OF THE PREFERRED EMBODIMENTS

The preferred embodiments of the present invention will be explained in detail below with reference to the drawings.

Figure 2A:
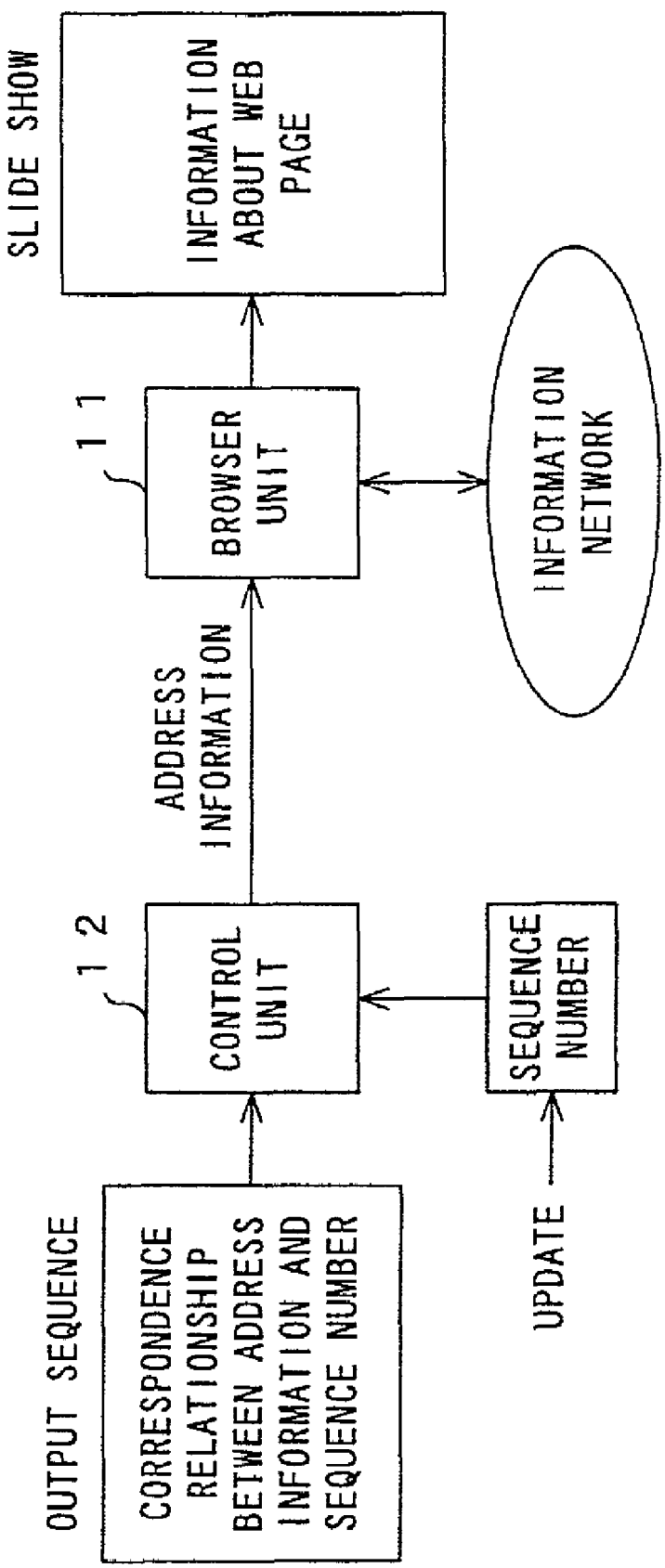
FIG. 2A is a principle diagram showing the slide show system according to the present invention.

FIG. 2A is a principle diagram of the preferred embodiments of the present invention. The slide show system shown in FIG. 2A includes a browser unit 11 and a control unit 12.

The browser unit 11 obtains information using the address information defined on an information network, and outputs the thus-obtained information. The control unit 12 informs the address information to the browser unit 11 according to a predetermined output sequence, and instructs the browser unit 11 to output information corresponding to the thus-informed information.

The address information defined on the information network corresponds to, for example, the URL defined on a WWW system. The information obtained using the address information corresponds to, for example, the multi-media information of a web page.

The output sequence of information is predetermined by preparing a correspondence relationship between one or more pieces of the address information and a sequence number. The control unit 12 informs the address information corresponding to the current sequence number to the browser unit 11, according to this output sequence. Thus, the browser unit 11 obtains information using the thus-informed address information, and can output the thus-obtained information.

When the current sequence number is updated, new address information is informed from the control unit 12 to the browser unit 11, and new information is outputted. By repeating these operations, information of web pages to be outputted is sequentially updated so that a slide show can be performed by using the web pages.

According to this slide show system, the control unit 12 informs the address information to the browser unit 11 according to the output sequence so that a user need not type a URL nor select a bookmark whenever pages are switched. Therefore, the user can concentrate on the explanation of the displayed information.

For example, the browser unit 11 shown in FIG. 2A corresponds to a WWW browser 33, a display device 24, and a speaker 25 shown in FIG. 2B, which will be described later. The control unit 12 shown in FIG. 2A corresponds to a slide show processing unit 31 shown in FIG. 2B.

In the slide show system of the present embodiments, the following four functions are provided for the presentation to be performed using a WWW browser:

Function 1: instructing a display sequence of the URLs which are registered in a bookmark list, using a slide operation button (manual mode)

Function 2: automatically causing a browser to display a plurality of pages in predetermined sequence and intervals using the URLs registered in a bookmark list (automatic mode)

Function 3: automatically generating background music (BGM) and a narration

Function 4: after downloading a web page to be displayed at a slide show, storing, this page as a local file, and executing the above-mentioned Functions 1 and 2 using this local file By being provided with the manual mode of Function 1, a user can perform a presentation manually switching pages like the performance of a slide show. Further, by being provided with the automatic mode of Function 2, a user can automatically switch pages without performing manual operations. Therefore, a user can concentrate on the explanation of displayed information.

Further, by being provided with Function 3, more effective presentation can be performed, and a narration can act as necessary explanation. Still further, by being provided with Function 4, a browser need not be connected to the Internet at that occasion so that a presentation can refrain from being interrupted by a connection failure.

Figure 2B:
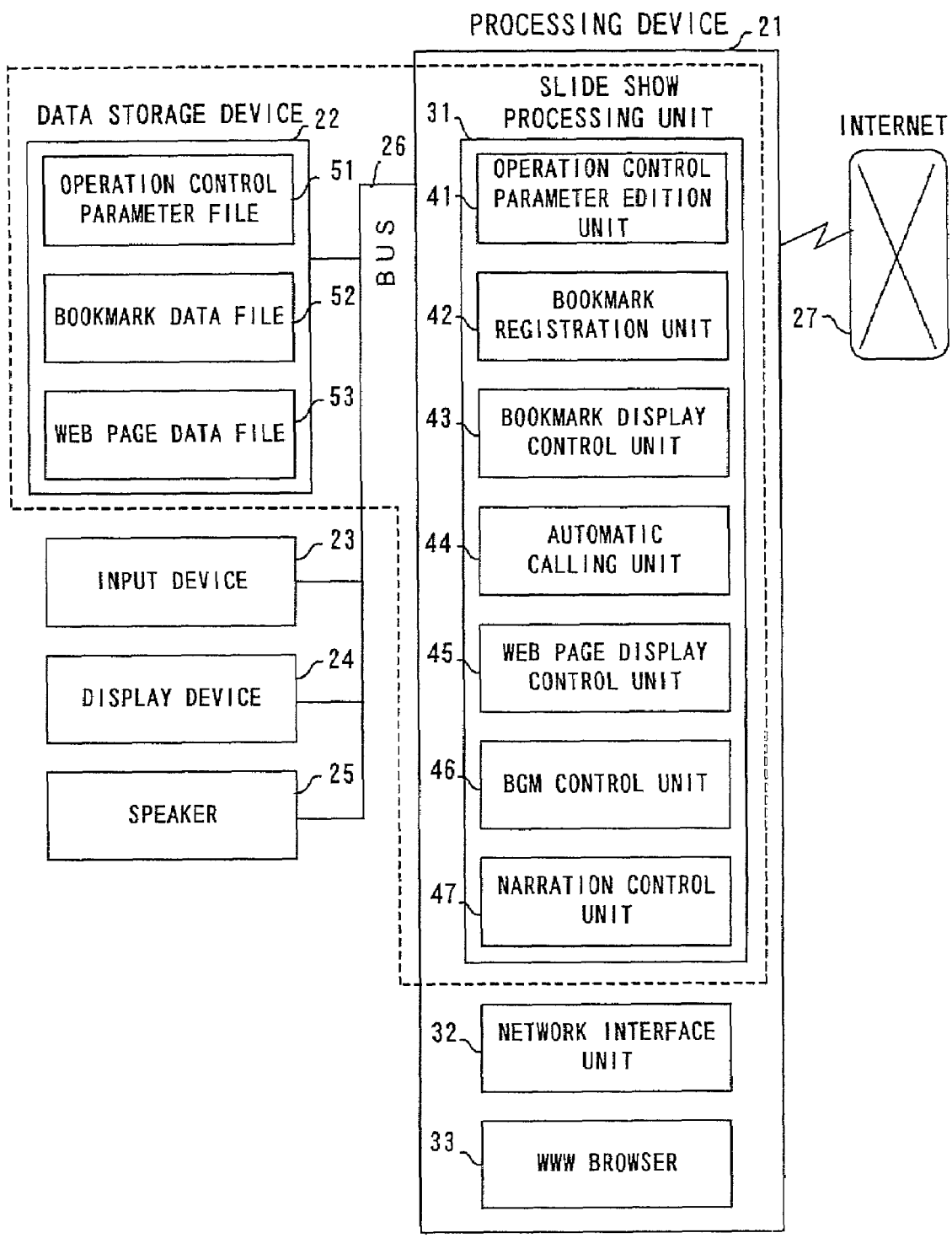
FIG. 2B is a diagram showing the configuration of the slide show system.

FIG. 2B is a configuration diagram showing a slide show system of the present embodiment. The slide show system shown in FIG. 2B is composed of a processing device 21, a data storage device 22, an input device 23, a display device 24, and a speaker 25. These devices are connected to each other via a bus 26.

The input device 23 corresponds to a pointing device such as a keyboard, a mouse or the like, or a touch panel and inputs instructions and data transmitted from a user to the programs executed by the processing device 21. The display device 24 corresponds to, for example, a CRT (cathode ray tube) display, and displays a screen of questions made from a program to the user, processing results, a web page, or the like.

The processing device 21 consists of a slide show processing unit 31, a network interface unit 32, and a WWW browser 33, and is connected to the Internet 27 via the network interface unit 32. An arbitrary method such as a dial-up connection to be performed via a public line, an exclusive line connection using an exclusive line or the like is used as a connection method.

Here, the slide show processing unit 31 and the data storage device 22 (parts encircled by a dotted line) of the processing device 21 mainly perform the above-mentioned functions 1 to 4 of the slide show system. The slide show processing unit 31 includes an operation control parameter edition unit 41, a bookmark registration unit 42, a bookmark display control unit 43, an automatic calling unit 44, a web page display control unit 45, a BGM control unit 46, and a narration control unit 47. The data storage unit 22 stores an operation control parameter file 51, a bookmark data file 52, and a web page data file 53.

The slide show processing unit 31 corresponds to software components described by programs, and expands the function of the WWW browser 33 by being included as a function of the WWW browser 33, or being provided as in-line or plug-in software.

The operation control parameter file 51 stores various kinds of control parameters which are required for the operation of the slide show system. The bookmark data file 52 stores information such as the title of a page registered as a bookmark, the URL or the like. The web page data file 53 stores information of the pages which are downloaded from a WWW server, in order to use this information for the slide show.

The operation control parameter edition unit 41 sets various kinds of control parameters in the operation control parameter file 51, and also has a function of changing these parameters. When a user instructs the registration of a bookmark, the bookmark registration unit 42 stores the information of the pages displayed by the WWW browser 33 in the bookmark data file 52. The bookmark display control unit 43 displays the thus-registered bookmark on a screen of the display device 24 according to the contents of the bookmark data file 52.

The automatic calling unit 44 automatically activates the web page display control unit 45, the BGM control unit 46, and the narration control unit 47, according to the contents of the operation control parameter file 51, and supplies necessary control parameters to these control units 45, 46, and 47.

The web page display control unit 45 reads the URL of a bookmark which is registered in the bookmark data file 52, according to the instructions of the automatic calling unit 44, and informs the thus-read URL to the WWW browser 33. The WWW browser 33 accesses the Internet 27 via the network interface unit 32 using the thus-informed URL or accesses the web page data file 53 using the thus-informed URL. Then, the web page display control unit 45 obtains information of the corresponding page and causes the display device 24 to display this information.

The BGM control unit 46 outputs predetermined BGM from the speaker 25 according to the instructions of the automatic calling unit 44. The narration control unit 47 outputs a predetermined narration from the speaker 25 according to the instructions of the automatic calling unit 44.

Figure 1:
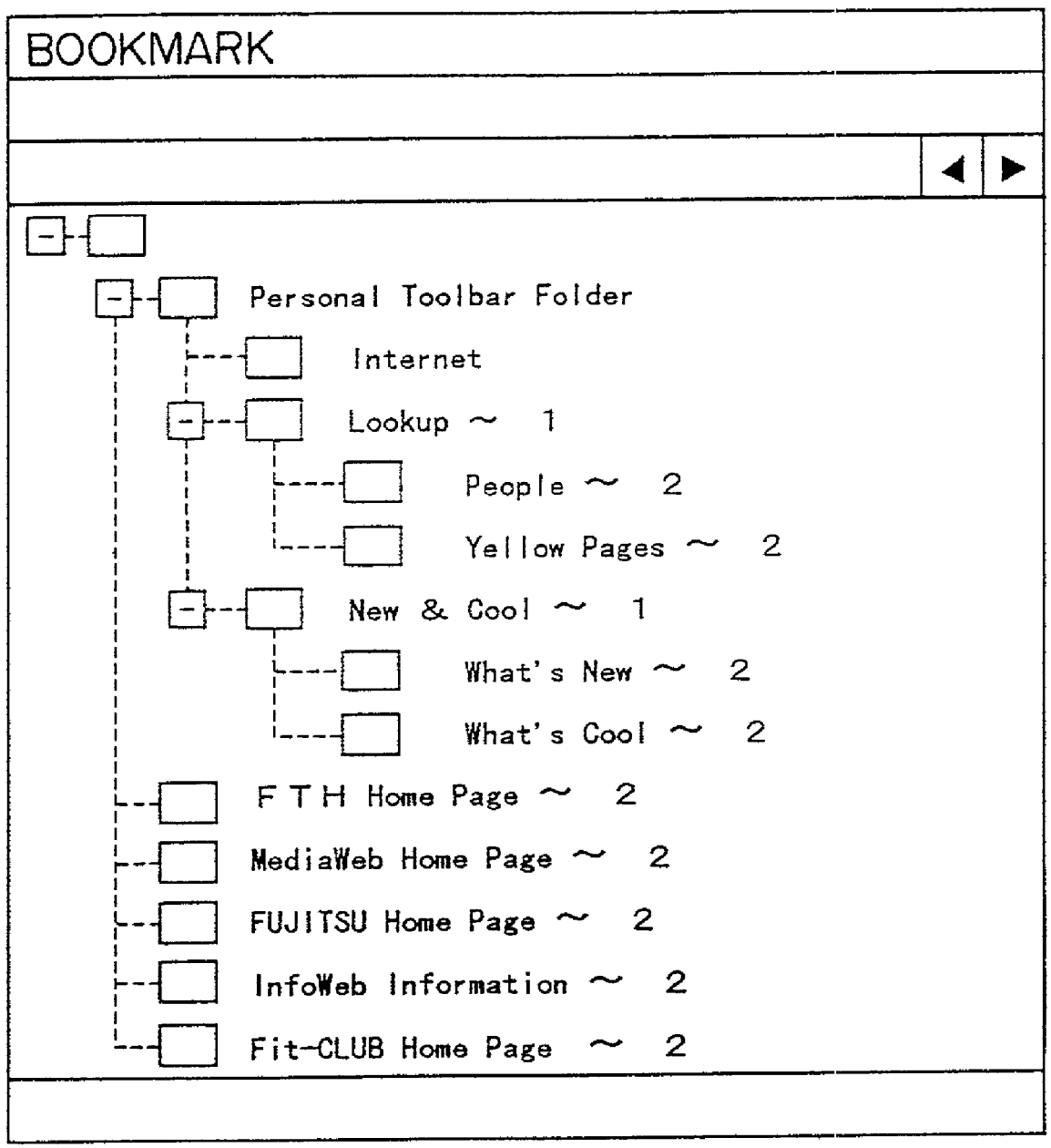
FIG. 1 is a diagram showing a conventional bookmark display screen.

In this slide show system, an image display bookmark system (Japanese patent application No. 9-264478) which can be more easily handled, can be used other than a conventional bookmark system shown in FIG. 1. According to this image display bookmark system, the image of an actual web page is obtained, and data (an image icon) in which the image is made to be an icon, are registered as a bookmark. A user can easily access his or her desired page by clicking a bookmark which is displayed as an image icon.

Figure 3:
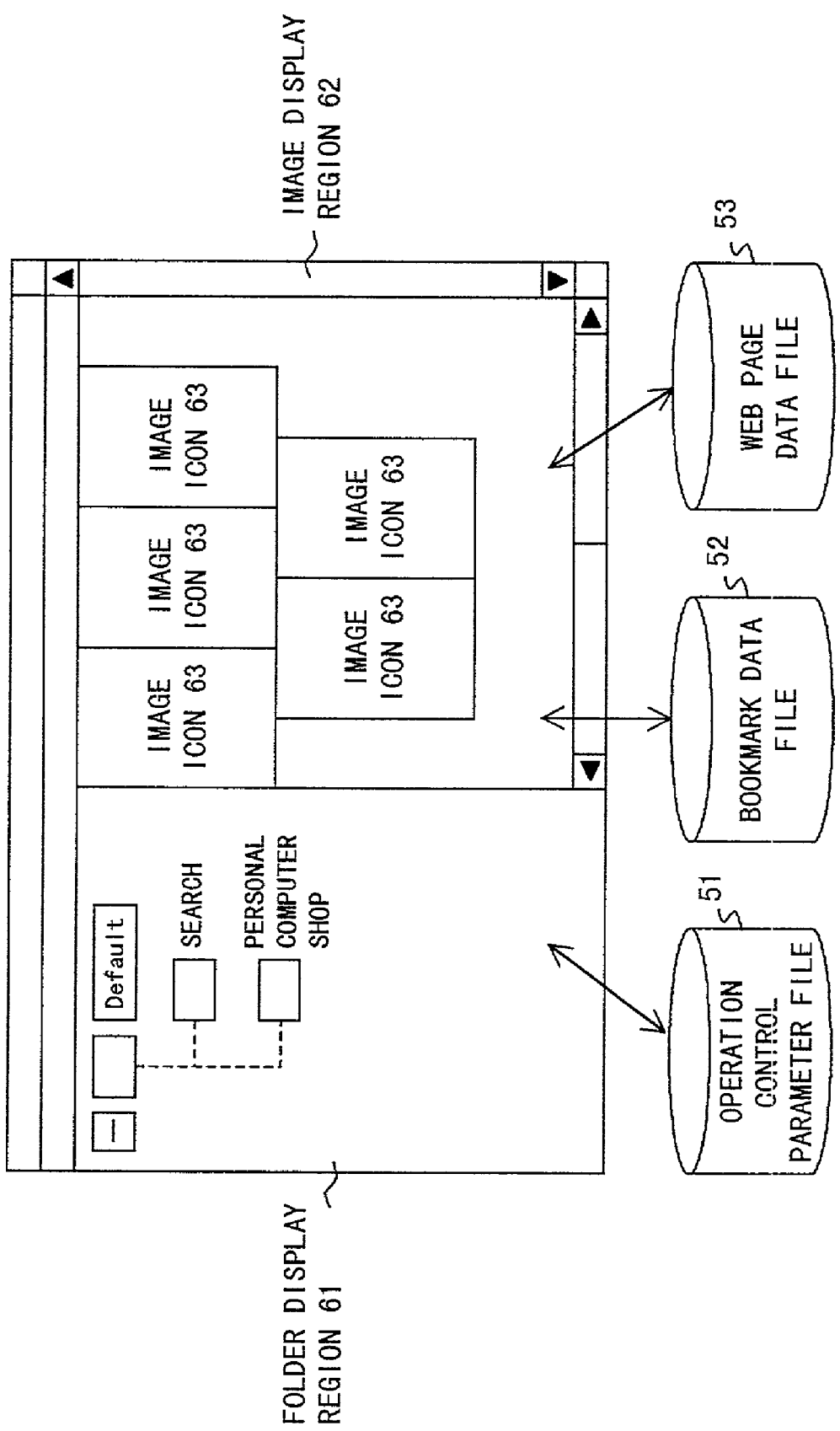
FIG. 3 is a diagram showing a bookmark page.

FIG. 3 shows the display screen of a bookmark page using such an image icon system. This screen is displayed in such a way that a user performs an operation of displaying the edition screen of a bookmark from the WWW browser 33 or that a user performs an operation of easily displaying a bookmark using a pop-up window. This screen includes a folder display region 61 and an image display region 62.

In the folder display region 61, several folders for storing a plurality of registered bookmarks are displayed, and generally a bookmark belonging to a single category is stored for each folder. In the image display region 62, a list of image icons 63 corresponding to the respective bookmarks in a folder which is selected by a user is displayed. Each of the image icons 63 is prepared by reducing the image of a web page corresponding to each bookmark.

According to this example, a folder such as "Default" is selected by a user, and five image icons 63 corresponding to the five bookmarks in this folder are displayed. The folder "Default" also includes two folders such as "search" and "personal computer shop" in addition to these five bookmarks.

By selecting these folders in the folder display region 61, a user can display the image icons 63 of bookmarks stored in these folders. By selecting an image icon 63 in the image display region 62, a page, the URL of which is registered in a corresponding bookmark, is automatically accessed to be displayed on a screen.

The slide show processing unit 31 shown in FIG. 2B can select a bookmark instead of a user and using the operation control parameter file 51, the bookmark data file 52, and the web page data file 53 which correspond to a bookmark page, and further can inform the URL of the thus-selected bookmark to the WWW browser 33.

FIG. 4 shows an example of the slide show screen to be displayed by the slide show system shown in FIG. 2B. This screen includes a web page 71, slide operation buttons 72, 73, and 74, and a termination button 75 (END).

A series of display sequence numbers is supplied to bookmarks to be used for the slide show. When a user pushes a reverse transmission button 72 in a manual mode, a page corresponding to a display sequence number which immediately precedes the currently displayed page, is displayed. When a user pushes a next transmission button 74, a page corresponding to a display sequence number which immediately follows the currently displayed page, is displayed. Here, the display sequence number represents a sequence for displaying the results obtained by accessing a WWW server when a plurality of pages are to be displayed. A pushing process of the button on a screen means an operation of clicking the button using a mouse or the like.

The termination button 75 is used when terminating a slide show in the manual mode. The stop button 73 is used for temporarily stopping the switching of pages in an automatic mode.

Here, operation buttons 72, 73, 74, and 75 are displayed on a screen, and a user clicks these buttons. However, these input operations can be performed according to an arbitrary method instructed from an arbitrary input device. For example, these operation functions can correspond to specific keys on a keyboard.

In the operation control parameter file 51, data such as shown in FIG. 5 are stored. In FIG. 5, AUTO corresponds to a flag indicating whether or not a display is performed in an automatic mode. When AUTO=Yes, an automatic mode is activated. When AUTO=No, a manual mode is activated.

MAXNUM is a parameter indicating the maximum value of a series of display sequence numbers. WAIT(i) is a parameter indicating a display time period of the page corresponding to a display sequence number i (i=1, 2, . . . , MAXNUM). This display time period corresponds to a time interval between the display of a current page and that of the next page. Here, these parameters are set as follows: MAXNUM=20, and WAIT(i)=60 (seconds)

BGM(i) corresponds to a flag indicating whether or not BGM is played when a page corresponding to the display sequence number i is displayed. When BGM(i)=Yes, BGM is played. When BGM(i)=No, BGM is not played. BGM_FILE(i) is a parameter indicating a file name of a file which stores the sound data of BGM to be played when a page corresponding to the display sequence number i is displayed. Here, this parameter is set to BGM FILE(i)=song.avi.

NARRATION(i) corresponds to a flag indicating whether or not a narration is played back when a page corresponding to the display sequence number i is displayed. When NARRATION(i)=Yes, a narration is played back. When NARRATION(i)=No, a narration is not played back. NARRATION_FILE(i) is a parameter indicating the file name of a file which stores the sound data of a narration to be played back when a page corresponding to the display sequence number i is displayed. Here, this parameter is set to NARRATION FILE(i)=na1.avi.

As WAIT(i), BGM(i), BGM FILE(i), NARRATION(i), and NARRATION_FILE(i), different data can be set for each display sequence number i. The files of BGM and a narration are stored in, for example, the data storage device 22 shown in FIG. 2B.

Further, for example, data as shown in FIG. 6 are stored in the bookmark data file 52. In FIG. 6, each set of bookmark data is composed of items such as "title", "URL", "image file name", "comment", "coordinate value", and "display sequence number".

In a column "title", the title data of a web page corresponding to each set of bookmark data are stored. In a column "URL", a URL of the web page is stored. A URL is generally described using a character string "http:" indicating an access destination on the Internet. When the access destination is data stored in the web page data file 53, the URL is described using the character string "file:" indicating a local file.

In a column "image file name", the file name of an image icon 63 shown in FIG. 3 is automatically named in order to be unique in a system, and the thus-named file name is stored. A "comment" column is used for a user to write a suitable comment. In a "coordinate value" column, the coordinate value of a position indicating the image icon 63 on a screen shown in FIG. 3 is stored. In a "display sequence number", a display sequence number specified by a user or a system is stored. The user can change this display sequence number via the bookmark display control unit 43.

Thus, the bookmark data file 52 stores a correspondence relationship between the URL of a web page of each bookmark and a display sequence number. Therefore, the URL of a web page corresponding to the current display sequence number can be obtained by referring to the bookmark data file 52.

Next, display operations performed by the slide show system shown in FIG. 2B will be explained with reference to FIG. 7 to FIG. 11.

Figure 7:
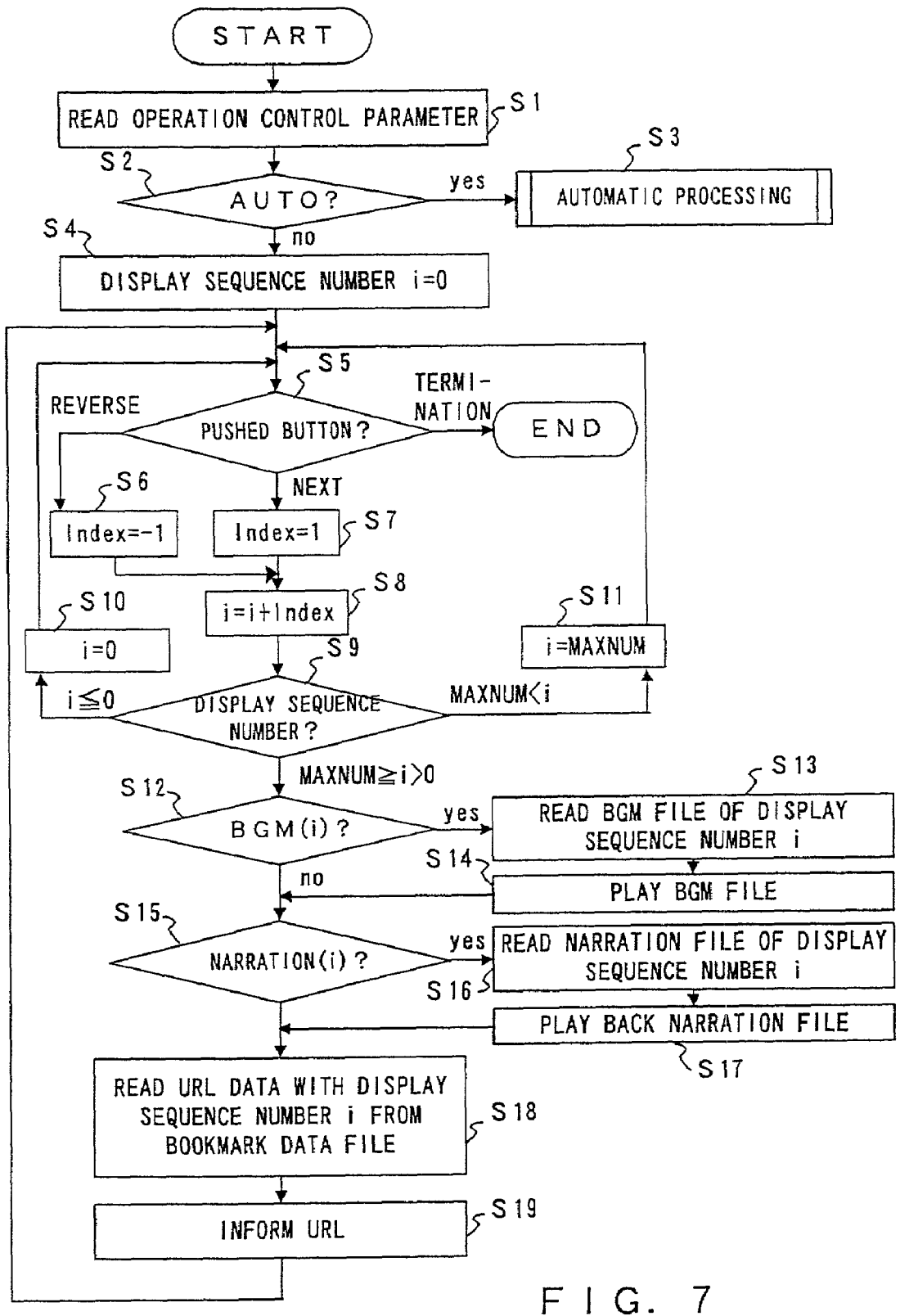
FIG. 7 is a flowchart showing display control processing.

FIG. 7 is a flowchart showing the display control processing performed by the slide show processing unit 31. First, the automatic calling unit 44 reads the operation control parameter file 51 from the data storage device 22 (step S1), and checks the value of a flag AUTO (step S2). When AUTO=Yes, an automatic mode is activated, and automatic processing is performed (step S3). The details of this automatic processing will be explained later.

When AUTO=No, a manual mode is activated, and 0 is set to the control variable i indicating a display sequence number (step S4). Then, it is determined which button shown in FIG. 4 a user has pushed (step S5). When the user pushed the reverse transmission button 72, −1 is set to the variable Index indicating a difference of the display sequence number (step S6). When the user pushed the next transmission button 74, 1 is set to the variable Index (step S7). A value obtained adding the Index to the display sequence number is re-set as i, and the value of i is checked (step S9).

When i≦0, no display sequence numbers are present. Accordingly, it is set that i=0 (step S10), and processes in and after step S5 are repeated. When i>MAXNUM, no display sequence numbers corresponding to this value are present. Accordingly, it is set that i=MAXNUM (step S11), and processes in and after step S5 are repeated.

In the case of 0<i≦MAXNUM, the value of a flag BGM(i) corresponding to the regeneration number i is checked (step S12). When BGM(i)=Yes, the BGM control unit 46 is activated, and the file name which is set in a BGM_FILE(i) is supplied to the unit 46.

The BGM control unit 46 reads a BGM file corresponding to the thus-received file name (step S13), plays the sound data (step S14), and returns the control to the automatic calling unit 44. Then, the automatic calling unit 44 repeats processes in and after step S15. When BGM(i)=No, processes in after step S15 are performed without activating the BGM control unit 46.

In step S15, the automatic calling unit 44 checks the value of a flag NARRATION(i) corresponding to the display sequence number i. When NARRATION(i)=Yes, the narration control unit 47 is activated, and the file name which is set in a NARRATION_FILE(i) is supplied to the unit 47.

The narration control unit 47 reads a narration file corresponding to the thus-received file name (step S16), played back the sound data (step S17), and returns the control to the automatic calling unit 44. Then, the automatic calling unit 44 repeats processes in and after step S18. When NARRATION(i)=No, processes in after step S18 are performed without activating the narration control unit 47.

In step S18, the automatic calling unit 44 activates the web page display control unit 45, and instructs this unit 45 to display a web page corresponding to the display sequence number i. The web page display control unit 45 reads the URL of a bookmark of the display sequence number i from the bookmark data file 52 (step S18), informs this URL to the WWW browser 33 (step S19), and returns the control to the automatic calling unit 44.

Then, the automatic calling unit 44 repeats processes in and after step S5. When a user pushes the termination button 75, processing in a manual mode is terminated.

In step S19 shown in FIG. 7, the WWW browser 33 to which a URL is informed performs display processing as shown in FIG. 8. The WWW browser 33 receives the URL from the web page display control unit 45 (step S21), and accesses a WWW server or a local file stored in the web data file 53 which stores the web page (step S22).

Here, in the case where the URL starts with "http:", a WWW server provided on the Internet 27 is accessed. In the case where the URL starts with "file:" the web page data file 53 is accessed. When information of the web page is obtained, this information is displayed on a screen of the display device 24 (step S23), and processing is terminated.

When the web page display control unit 45 informs the URL to the WWW browser 33, a function of communicating between applications such as a DDE (dynamic data exchange) can be used.

The DDE is a kind of communication between processes, and exchanges data between applications using a shared memory. The application software provided on a transmission side can use the DDE for the real-time data exchange in the case where data are transferred only once or where the contents of updating processing are transmitted to the application software provided on a reception side when new data are available. Further, the DDE is automatically performed between applications without involving a user.

Figure 9:
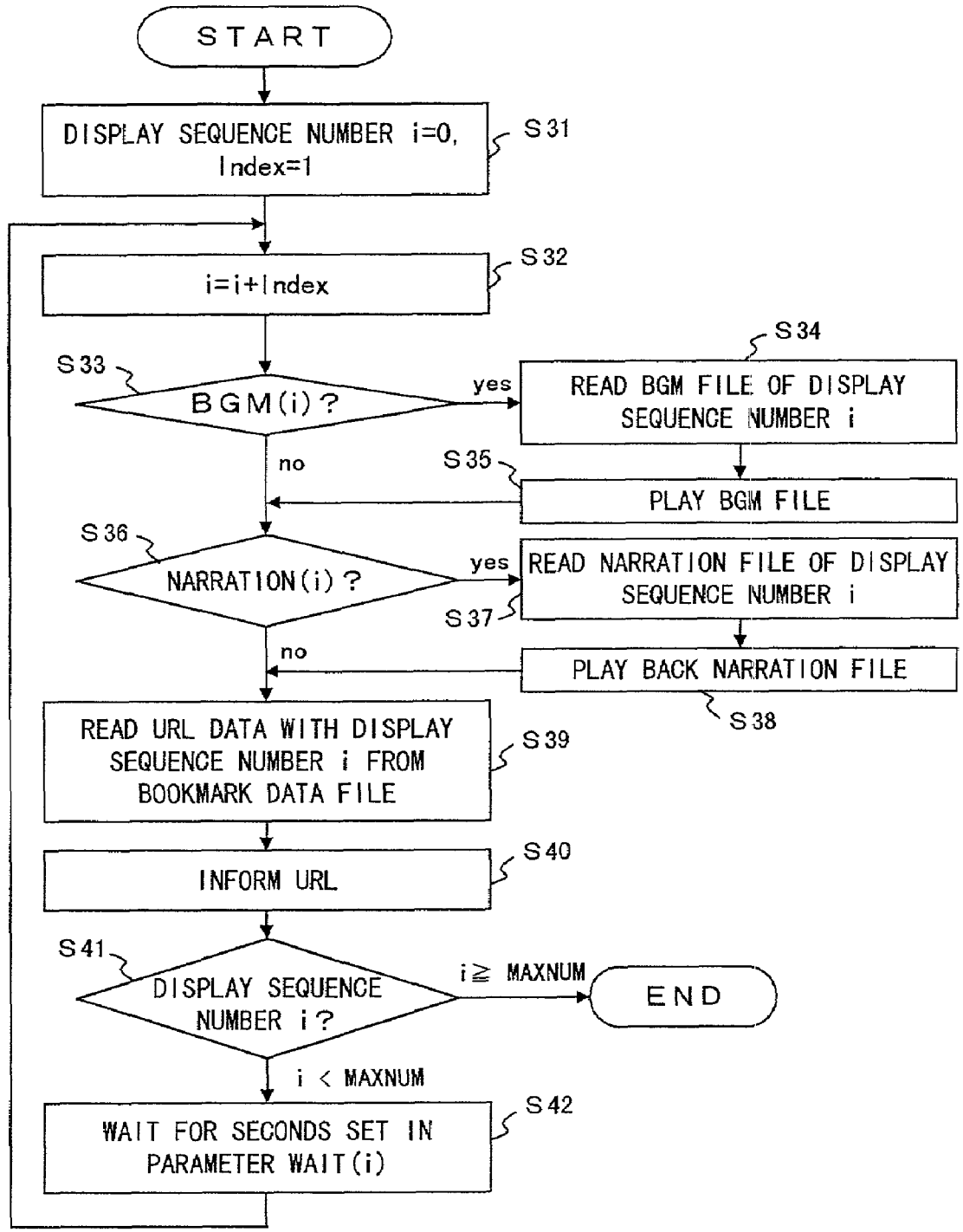
FIG. 9 is a flowchart showing first automatic processing.

In step S3 shown in FIG. 7, the automatic calling unit 44 performs automatic processing as shown in FIG. 9. First, the automatic calling unit 44 sets a control variable i indicating a display sequence number to 0, and sets a variable Index indicating a difference of the display sequence number to 1 (step S31). Next, a value obtained by adding Index to the display sequence number i is re-set as i (step S32), and the processes in and after S33 are performed.

Here, the processes to be performed in steps S33 to S40 are the same as those performed in steps S12 to S19 shown in FIG. 7. The processing to be performed by the WWW browser 33 to which a URL is informed in step S40 is the same as that shown in FIG. 8.

Next, the automatic calling unit 44 checks a value of the display sequence number i (step S41). When i<MAXNUM, the automatic calling unit 44 waits for a time period which is set in WAIT(i) (step S42), and repeats the processes in and after step S32. When i reaches MAXNUM, no display sequence numbers greater than i are present, and accordingly the automatic processing is terminated.

When a user pushes the stop button 73 while the automatic processing is being operated, which is not specifically shown in FIG. 9, the automatic calling unit 44 can temporarily stop the display operation of the next page without regard to a time period which is set in the WAIT(i). In this case, the next transmission button 74, for example, is used for re-starting the display operations. When a user pushes the termination button 75, the automatic calling unit 44 can terminate the automatic processing. Thus, according to the display control processing in an automatic mode, a display sequence number is automatically incremented without a user pushing the operation buttons 72 and 74 so that a slide show is performed. Further, different BGM and different narrations can be played back for each web page to be displayed so that various kinds of slide shows can be performed.

In the above-mentioned embodiments, a different display interval, a different BGM file, and a different narration file are used for each display sequence number. When automatic processings are to be more easily performed, the same display interval, the same BGM file, and the same narration file can be used.

FIG. 10 shows the data of the operation control parameter file 51 to be used for this automatic processing. In FIG. 10, the flag AUTO and the parameter MAXNUM is the same as the operation control parameter file 51 shown in FIG. 5.

A parameter WAIT indicates the display time period of a page which is common to all the display sequence numbers in an automatic mode. A flag BGM indicates whether or not BGM which is common to all the display sequence numbers is played. A parameter BGM_FILE indicates the file name of a file which stores sound data of the BGM. A flag NARRATION indicates whether or not a narration which is common to all the display sequence numbers is played back. A parameter NARRATION FILE indicates the file name of a file which stores sound data of the narration.

Figure 11:
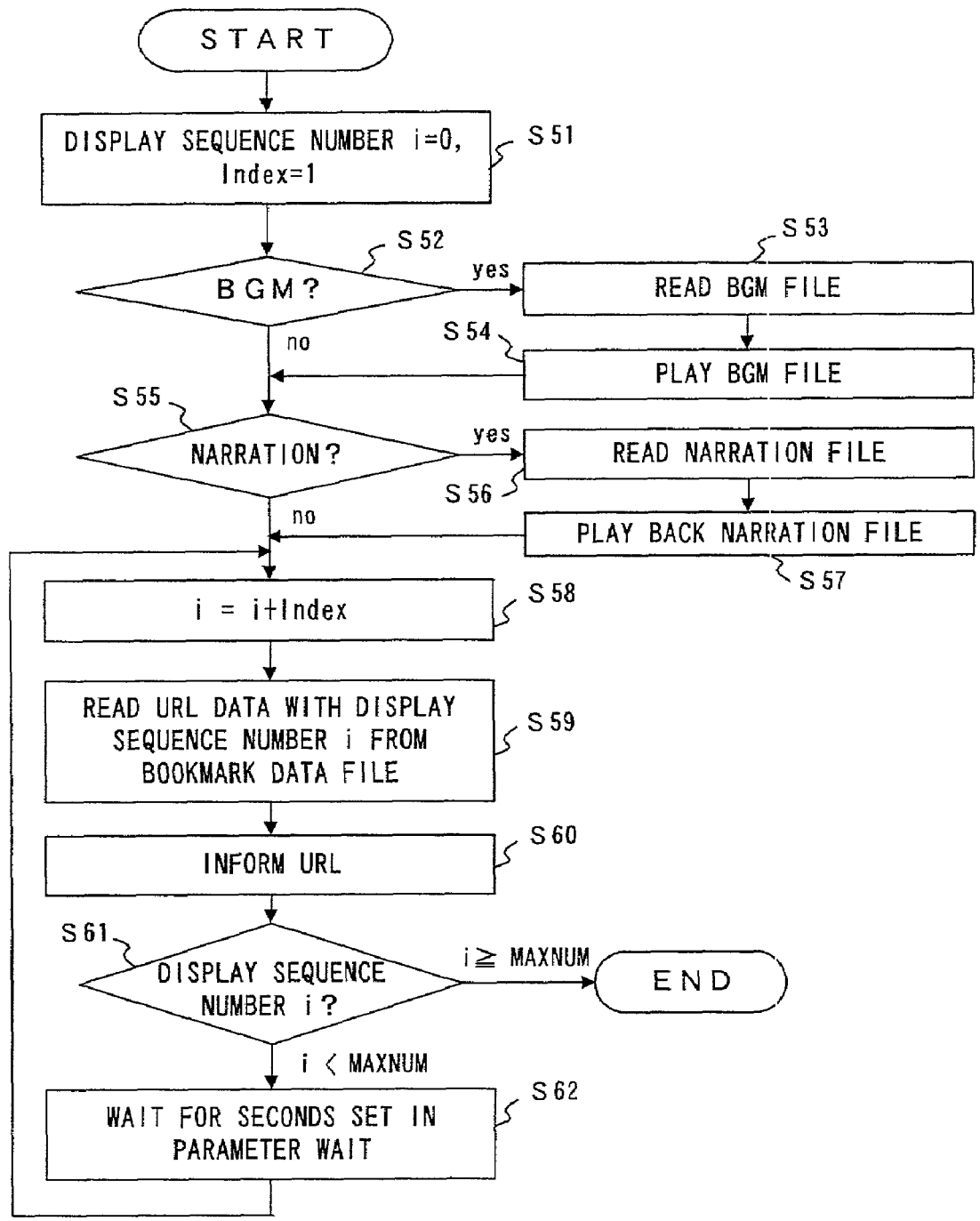
FIG. 11 is a flowchart showing second automatic processing.

When the operation control parameter file 51 shown in FIG. 10 is used, the automatic calling unit 44 performs automatic processing as shown in FIG. 11, in step S3 of FIG. 7. First, the automatic calling unit 44 sets a control variable i to 0 which indicates a display sequence number, sets a variable Index to 1 which indicates a difference of the display sequence number (step S51), and checks a value of the flag BGM (step S52). If BGM=Yes, the BGM control unit 46 is activated, and a file name which is set in BGM_FILE is supplied to the BGM control unit 46.

The BGM control unit 46 reads a BGM file corresponding to the thus-received file name (step S53), plays the sound data (step S54), and returns the control to the automatic calling unit 44. Then, the automatic calling unit 44 performs the processes in and after step S55. When BGM=No, processes in and after step S55 are performed without activating the BGM control unit 46.

In step S55, the automatic calling unit 44 checks the value of a flag NARRATION. When NARRATION=Yes, the narration control unit 47 is activated, and a file name which is set in the NARRATION_FILE is supplied to the narration control unit 47.

The narration control unit 47 reads a narration file corresponding to the thus-received file name (step S56), plays back the sound data (step S57), and returns the control to the automatic calling unit 44. Then, the automatic calling unit 44 performs the processes in and after step S58. When NARRATION=No, processes in after step S58 are performed without activating the narration control unit 47.

In step S58, the automatic calling unit 44 re-sets a value which is obtained by adding the Index to the display sequence number i, as i, and performs processes in and after step S59. Here, the processes to be performed in steps S59, S60, and S61 are the same as those performed in steps S39, S40, and S41 shown in FIG. 9. A processing to be performed by the WWW browser 33 to which the URL is informed in step S60 is the same as that shown in FIG. 8.

When i<MAXNUM in step S61, the automatic calling unit 44 waits for a time period which is set in WAIT (step S62), and repeats the processes in and after step S58. In step S61, when i reaches MAXMUM, no sequence numbers greater than i are present, and accordingly the automatic processing is terminated.

According to this display control processing, the BGM and the narration are played back without being switched while the slide show is being performed, and only information of web pages is switched. Therefore, it is not necessary to provide a BGM file and a narration file for each web page to be displayed.

Figure 12:
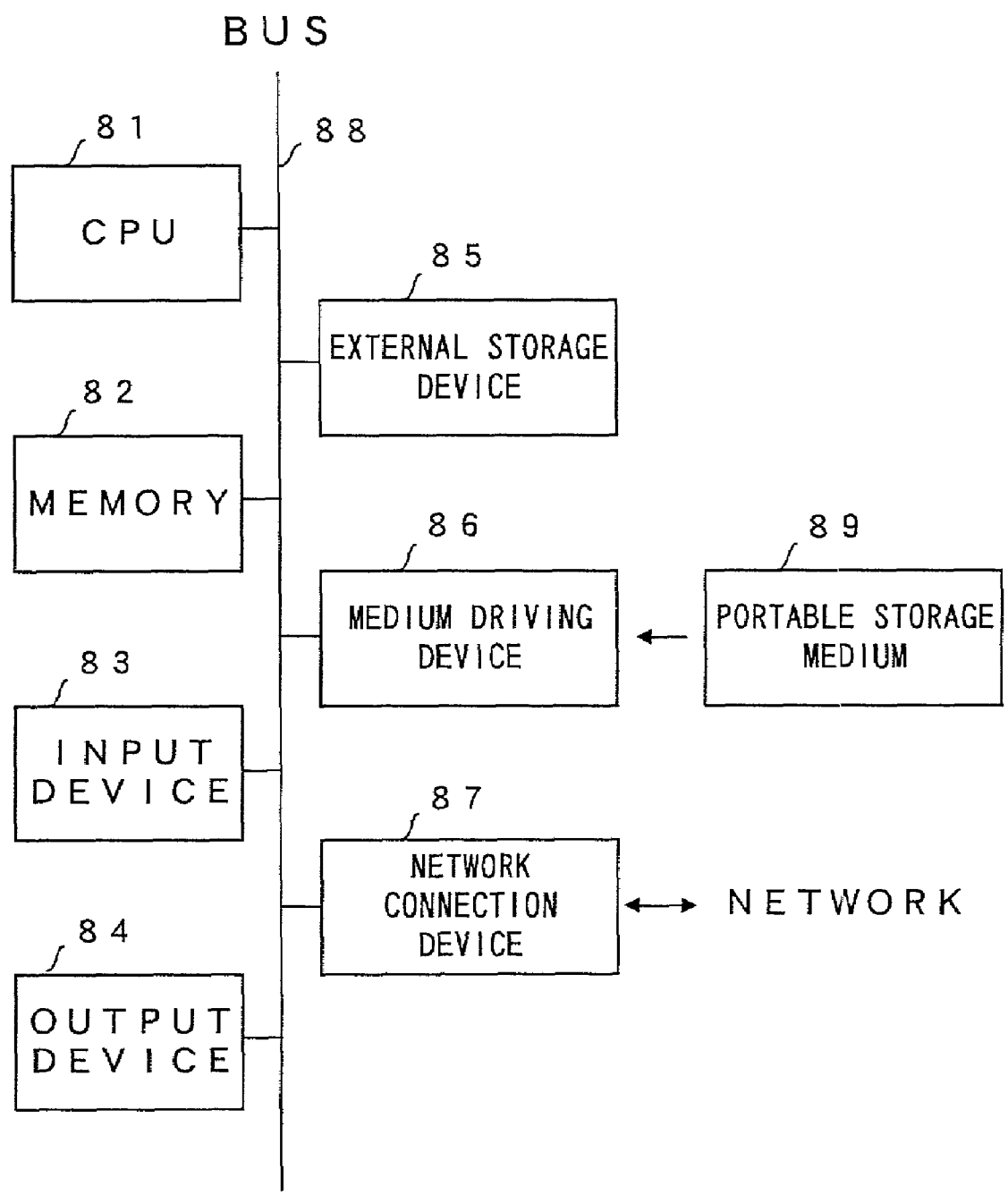
FIG. 12 is a diagram showing the configuration of an information processing device.

The slide show system shown in FIG. 2B can be configured using an information processing device (computer) as shown in FIG. 12. The information processing device shown in FIG. 12 includes a CPU (central processing unit) 81, a memory 82, an input device 83, an output device 84, an external storage device 85, a medium driving device 86, and a network connection device 87. These devices are connected to each other via a bus 88.

The memory 82 includes, for example, a ROM (read only memory), a RAM (random access memory) and the like, and stores programs and data to be used for processings. The CPU 81 performs required processings by executing the programs using the memory 82.

The slide show processing unit 31, the operation control parameter edition unit 41, the bookmark registration unit 42, the bookmark display control unit 43, the automatic calling unit 44, the web page display control unit 45, the BGM control unit 46, and the narration control unit 47 shown in FIG. 2B, and the like correspond to software components which are described by a program, and each of these software components is stored in a specific program code segment in the memory 82.

The input device 83 corresponds to the input device 23 shown in FIG. 2B, and is used for the input of the instructions or the information transmitted from a user. The output device 84 includes the display device 24 and the speaker 25 shown in FIG. 2B, and is used for the output of the question to a user, the information of a web page, BGM, a narration or the like.

The external storage device 85 is, for example, a magnetic disk device, an optical disk device, a magneto-optical disk device or the like. The above-mentioned programs and data are stored in the external storage device 85, and if necessary, these items can be loaded to the memory 82 to be used. The external storage device 85 can be used as the data storage device 22 shown in FIG. 2B.

The medium driving device 86 drives a portable storage medium 89, and accesses the storage contents. As the portable storage medium 89, an arbitrary computer-readable storage medium such as a memory card, a floppy disk, a CD-ROM (compact disk read only memory), an optical disk, a magneto-optical disk or the like is used. The above-mentioned programs and data are stored in the portable storage medium 89, and the thus stored items can be loaded to the memory 82 to be used, if necessary.

The network connection device 87 is controlled by the network interface unit 32 shown in FIG. 2B, is connected to the Internet 27 shown in FIG. 2B via an arbitrary network such as a LAN (local area network) or the like, and performs a data conversion to be required for communications. Further, the above-mentioned programs and data may be received from an external device so that these received items are loaded to the memory 82 to be used, if necessary.

Figure 13:
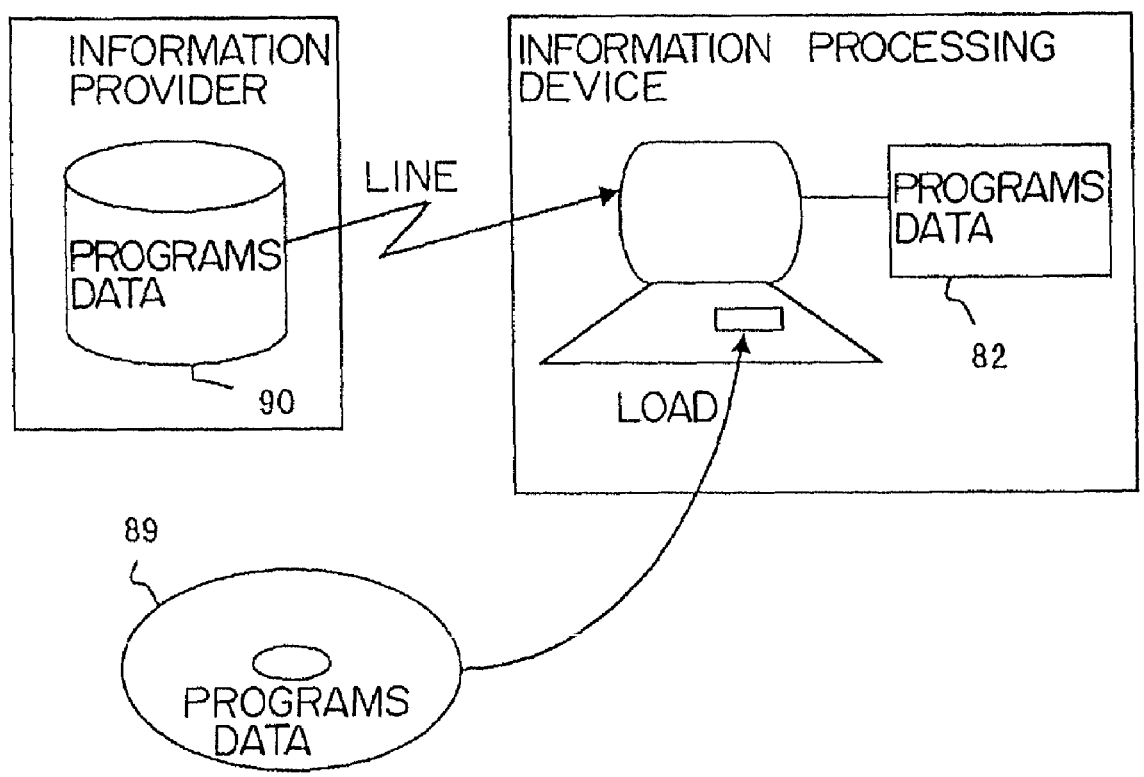
FIG. 13 is a diagram showing storage media.

FIG. 13 shows computer readable storage media which can supply programs and data to the information processing device shown in FIG. 12. Programs and data which are stored in the portable storage medium 89 or an external database 90 are loaded to the memory 82. Then, the CPU 81 executes the programs using these data and performs the required processings.

According to the present invention, information of one or more web pages can be easily and effectively displayed when a presentation or a conference takes place, using a WWW browser which refers to the information of the WWW.

In a manual mode, for example, a slide operation button is provided so that web pages can be sequentially accessed using existing bookmarks. Therefore, a user can smoothly progress a presentation without typing a URL.

Further, in an automatic mode, a plurality of web pages can be automatically displayed according to a predetermined sequence and a display time period. Therefore, a user can concentrate on a presentation without being directly involved in a display operation.

Further, since BGM and a narration can be automatically played back, an effective presentation can be performed according to the predetermined procedures.

What is claimed is:

1. A computer-readable storage medium which stores a program for causing a computer to perform:
    incrementing a control variable indicating one of a plurality of sequence numbers of a predetermined output sequence that is specified by a user;
    referring to a correspondence relationship between a plurality of pieces of URL address information defined on an information network for web page information and the sequence numbers to obtain address information corresponding to a sequence number indicated by the variable;
    informing the obtained address information to a browser, and instructing output of web page information corresponding to the informed address information upon determining that the browser is not to be connected to the Internet; and
    storing the web page information to be outputted corresponding to URL address information,
    wherein the web page information which is stored is obtained using address information.

2. A computer-readable storage medium which stores a program for causing a computer to perform:
    incrementing a control variable indicating one of a plurality of sequence numbers of a predetermined output sequence that is specified by a user;
    referring to a correspondence relationship between a plurality of pieces of URL address information defined on an information network for web page information and the sequence numbers to obtain address information corresponding to a sequence number indicated by the variable;
    obtaining web page information using the obtained address information;
    outputting the obtained web page information upon determining that a browser is not to be connected to the Internet; and
    storing the web page information to be outputted corresponding to URL address information,
    wherein the web page information which is stored is obtained using address information.

3. A slide show method comprising:
    preparing a correspondence relationship between a plurality of pieces of URL address information defined on an information network for web page information and a plurality of sequence numbers of a predetermined output sequence that is specified by a user;
    incrementing a control variable indicating one of the sequence numbers;
    obtaining address information corresponding to a sequence number indicated by the variable with reference to the correspondence relationship;
    obtaining web page information using the obtained address information;
    presenting the obtained web page information upon determining that a browser is not to be connected to the Internet; and
    storing the web page information to be outputted corresponding to URL address information,
    wherein the web page information which is stored is obtained using address information.

4. A slide show system, comprising:
    a browser unit to obtain web page information using URL address information defined on an information network and to output the obtained information;
    a bookmark storage unit to store a predetermined correspondence relationship between a plurality of pieces of URL address information of web page information and a plurality of sequence numbers representing a predetermined output sequence that is specified by a user;
    a control unit to increment a control variable indicating one of the sequence numbers, to refer to the correspondence relationship to obtain address information corresponding to a sequence number indicated by the variable, to inform the obtained address information to the browser unit, and to instruct output of web page information corresponding to the informed address information upon determining that the browser unit is not to be connected to the Internet; and
    a web page storage unit to store the web page information to be outputted corresponding to URL address information, wherein the browser unit obtains the web page information which is stored in the web page storage unit using address information informed by the control unit.

5. The slide show system according to claim 4, further comprising:
an operation unit to allow the user to specify web page information to be outputted next, wherein
the control unit informs address information corresponding to the specified web page information by the operation unit to the browser unit.

6. The slide show system according to claim 5, wherein the operation unit specifies one of the web page information pieces before and after web page information currently being outputted as the web page information to be outputted next.

7. The slide show system according to claim 4, wherein the control unit informs the plurality of pieces of URL address information to the browser unit according to the output sequence.

8. The slide show system according to claim 7, wherein the control unit informs the plurality of pieces of URL address information to the browser unit at prescribed time intervals.

9. The slide show system according to claim 8, wherein the control unit changes the time intervals according to each of the plurality of sequence numbers.

10. The slide show system according to claim 4, further comprising:
a sound output unit to output sound information including at least one of music and a narration, wherein
the control unit instructs the sound output unit to output the sound information.

11. The slide show system according to claim 10, wherein the control unit determines sound information to be outputted according to a user-specified sequence number of the address information representing the output sequence.

12. The slide show system according to claim 4, wherein the browser unit obtains web page information via a communication network using address information informed by the control unit.

13. The slide show system of claim 4, wherein the system does not require manual advancement of the address information by the user.

* * * * *

UNITED STATES PATENT AND TRADEMARK OFFICE
CERTIFICATE OF CORRECTION

| | | |
|---|---|---|
| PATENT NO. | : 7,047,489 B2 | Page 1 of 1 |
| APPLICATION NO. | : 09/244043 | |
| DATED | : May 16, 2006 | |
| INVENTOR(S) | : Hironori Kanno et al. | |

It is certified that error appears in the above-identified patent and that said Letters Patent is hereby corrected as shown below:

On the cover page, (56) References Cited, Other Publications, column 2, line 3, change "9/6/205" to --9/6/2005--

Signed and Sealed this

Thirty-first Day of October, 2006

JON W. DUDAS
*Director of the United States Patent and Trademark Office*